United States Patent

Lyon et al.

[15] 3,641,998
[45] Feb. 15, 1972

[54] ANIMAL AND BIRD MEMBER OPERATED VACCINATOR

[72] Inventors: James Lyon, P.O. Box 30, San Diego, Calif. 92112; Edward M. Hendrix, Rte. 2, Bentonville, Ark. 72712

[22] Filed: Dec. 5, 1969

[21] Appl. No.: 882,474

[52] U.S. Cl..............................128/218, 43/131, 128/253
[51] Int. Cl. .......................................................A61m 5/20
[58] Field of Search ..............128/218 R, 218 A, 218 F, 253; 43/131

[56] References Cited

UNITED STATES PATENTS 3,362,406  1/1968  Logsdon..............................128/218 R
3,302,645  2/1967  Lockmiller.......................128/253 UX
2,591,457  4/1952  Maynes...............................128/218 F
3,217,445  11/1965  Wade.........................................43/131

*Primary Examiner*—Lucie H. Laudenslager
*Attorney*—Knox & Knox

[57] ABSTRACT

An electrically powered vaccinator operated by a body member of the bird or animal being vaccinated, usually the wing or leg of a chicken, which is manually brought into slight pressure contact with a plate operating a power-controlling switch, so that a vaccine applicator of needle or spray type is actuated at the instant that the body member is in optimum position for injection or spraying. The switch and contact plate assembly is shiftably mounted for multiple uses and the dosage and/or penetration of the body member is adjustable.

3 Claims, 5 Drawing Figures

PATENTED FEB 15 1972

3,641,998

INVENTOR.
JAMES LYON
EDWARD M. HENDRICKS
BY
Knox & Knox

ANIMAL AND BIRD MEMBER OPERATED VACCINATOR

BACKGROUND OF THE INVENTION

Inoculation of birds and animals on a mass scale is common procedure, especially as related for example to chickens and laboratory test animals where identical dosage is repetitively administered. Sometimes variation of penetration and/or dosage is required as in successive treatments or for different sizes and ages of the chickens or other animals. Where a beak cauterizer such as that disclosed in U.S. Pat. No. 3,463,155 is already available, the instant invention can be incorporated therewith to provide auxiliary equipment enabling either a spray- or needle-type vaccinator to be selectively clipped in place for alternative and immediate use. In prior usage the body member of the chicken has been held while the vaccine applicator was either entirely operated by hand or semiautomatically power operated with the power controlled by a hand or knee-operated switch. This prior equipment left something to be desired in timing and uniformity in the administration of the vaccine. Human error due to ineptness or weariness of the operator severely affected efficiency.

SUMMARY OF THE INVENTION

A vaccinator characterized by an electrically powered syringe operated by direct contact with a switch of a body member such as a wing or leg so that said body member is properly and optimally positioned relative to the syringe at the instant of application of the vaccine. The switch is incorporated with a pressure plate against which the body member is manually pressed and the pressure plate is locally relieved to allow effective access of the vaccine applicator to the body member. Adjustment of dosage and penetration when a needle is used is provided for by making the syringe stroke variable and pressure plate adjustable relative to the applicator.

SHORT DESCRIPTION OF THE DRAWING

FIG. 1 is a side elevation of the vaccinator assembly;
FIG. 2 is a fragmentary top plan view of the same;
FIG. 3 is an enlarged fragmentary end view taken from the right-hand end of FIG. 1;
FIG. 4 is an enlarged vertical sectional view taken on the line 4—4 in FIG. 1, to show the quick attach and release means for the replaceable syringe; and
FIG. 5 is an enlarged sectional view of the pressure plate and releasable mounting.

DESCRIPTION OF THE PREFERRED EMBODIMENT

Figure 1:
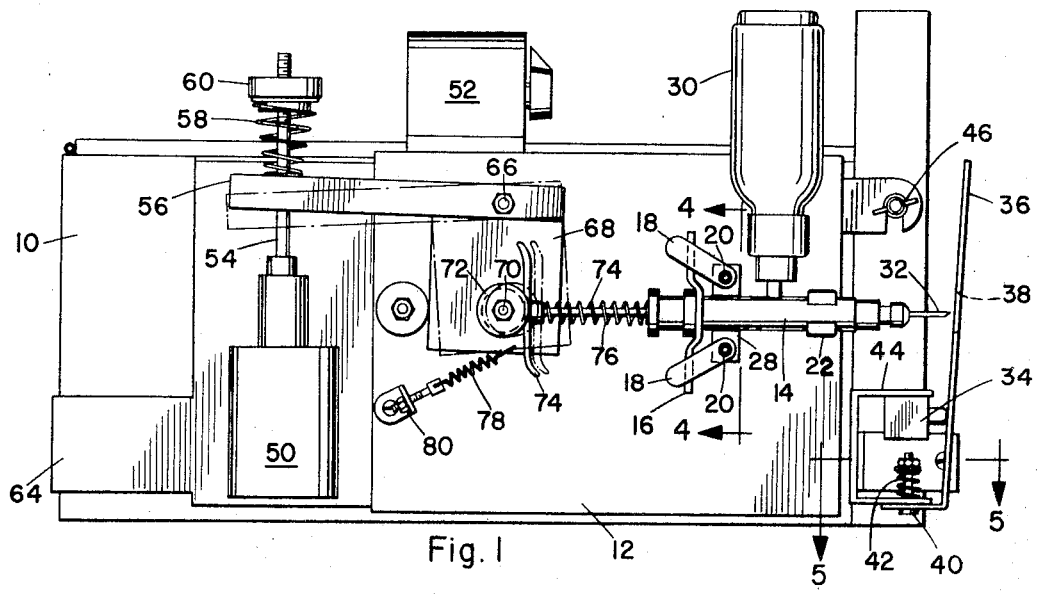
Figure 2:
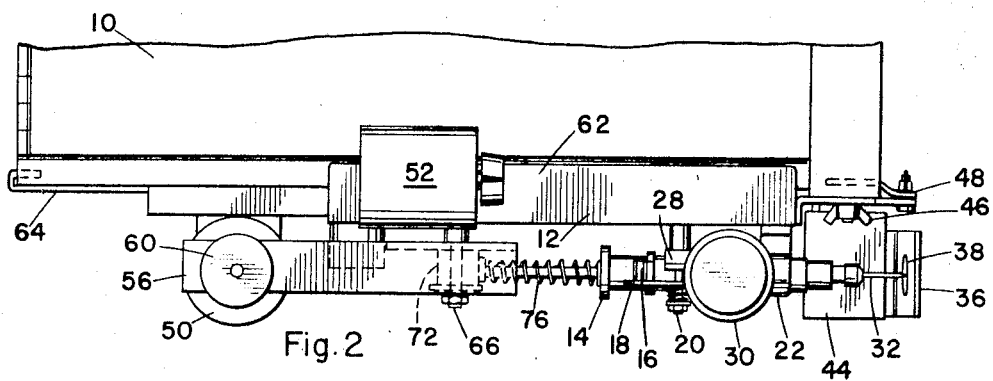
Figures 3, 4, 5:
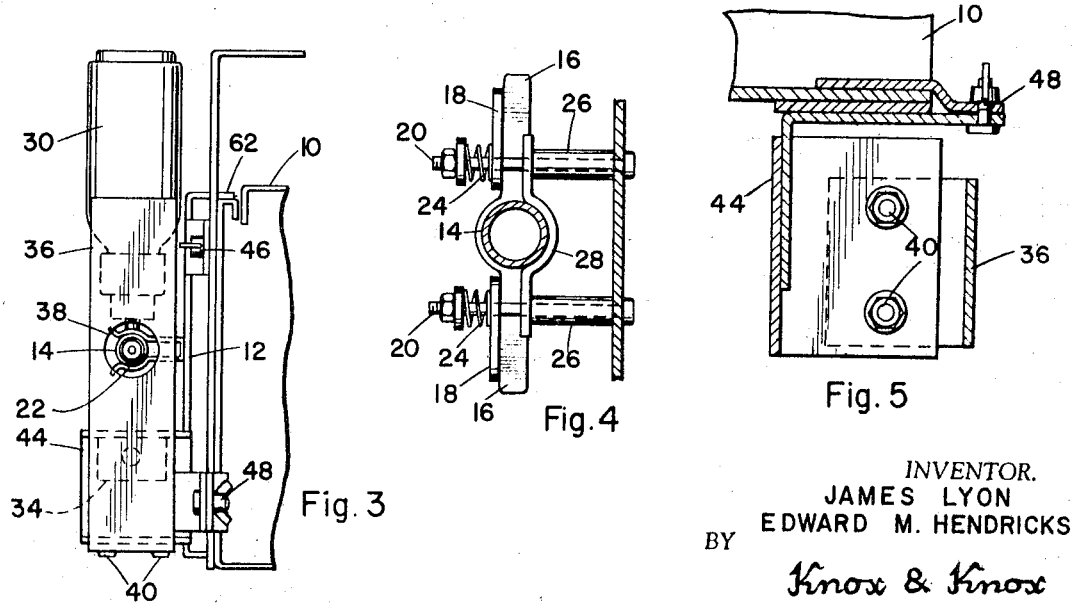

A suitable supporting frame or cabinet is indicated generally by the numeral 10. This may be the cabinet of a beak cauterizer such as that disclosed in U.S. Pat. No. 3,463,155 with an attachable vertical wall portion 12 to which is secured an electrically powered syringe 14. The syringe may be of conventional form with opposed finger pieces 16 removably clamped in place by somewhat elongated wing plates 18 secured by pivot members 20 which may be bolts. Further stabilization of the syringe is accomplished by the simple spring clip 22. The wing plates 18 are spring biased into frictional contact with the finger pieces by springs 24 and spacer sleeves 26 hold a syringe seat plate 28 spaced from the vertical wall portion 12 of the cabinet so that the syringe is positioned on the side of the frame as indicated in FIG. 4.

A vaccine reservoir container 30 feeds into the barrel of the syringe 14 and the syringe is provided with an applicator element 32 which may be of either penetrating needle or spray type. If the spray type is used, when chickens are being vaccinated, a few feathers are plucked to provide small areas with open follicles at the point of innoculation thus assuring proper exposure to the vaccine spray.

Perfect timing of the electrically operated syringe actuation is accomplished by a control switch, indicated as a microswitch 34 which is normally open and is closed by a pressure plate 36 when the latter is pressed toward the syringe by direct pressure contact therewith of a body member of the bird or animal being vaccinated. Ordinarily the bird or animal will be manually held.

The pressure plate 36 is relieved, as for example by an aperture 38, opposite to the vaccine applicator element 32 and essentially pivotal mounting of the pressure plate is accomplished by pivot bolts 40 with a spring 42 biasing the plate outwardly for the OFF position of microswitch 34. Both switch 34 and pressure plate 36 are thus mounted on a subframe 44 removably and adjustably bolted and clamped to the wall portion 12 as at 46 and 48. This structure permits the switch assembly, and particularly the pressure plate, to be adjusted relative to the vaccine applicator element 32, for variation of penetration and/or spray action.

Actuation of the microswitch 34 closes an electric circuit, not deemed necessary to illustrate, through a solenoid 50 and rheostat 52 in series so that a variable impulse provides a corresponding movement of an armature 54 which is resiliently coupled to a bellcrank 56 by a spring 58 on the armature 54, the latter being threaded to receive a spring-adjusting nut 60. The wall portion 12 may have a top flange 62 providing a seat for the rheostat 52 and a steadying member 64 may be provided to hook securely onto the supporting frame or cabinet 10.

The bellcrank 56 has a pivotal connection 66 and an arm 68 carrying a syringe drive pin 70 with bearing sleeves 72. The syringe 14 has a plunger with a head 74 biased to retracted position by a coaxial spring 76. Further biasing in the same direction is provided by a spring 78 under tension between the bellcrank arm 68 and the wall portion 12. This last-mentioned spring is also adjustable as indicated at 80.

From the foregoing description of one preferred embodiment of this invention it will be evident that a body member of a bird or other animal manually pressed against the pressure plate 36 will actuate microswitch 34 to closed position, thus actuating the syringe 14 at the instant that the body member is properly exposed at the relieved portion 38 of the pressure plate. Since the pressure plate 36 can be adjusted relative to the vaccine applicator element, and since the strength of the impulse driving the syringe can both be adjusted the penetration or spray action can be accurately adjusted for repetitive use.

What is claimed as new is:

1. A frame having a wall portion (12) with a syringe seat plate (28) and coacting wing plates (18);
   a multiple dose syringe mounted on said seat plate and having finger pieces (16) clamped in place by said wing plates, said syringe having a vaccine applicator element and a plunger operatively mounted in a vaccine-receiving cylinder;
   an electromechanical actuator for said syringe operatively mounted on said frame;
   a switch connected to control the functioning of said actuator; and
   a pressure plate operatively mounted adjacent said vaccine applicator and accessible for pressure contact by a body member of the animal or bird vaccinated to close said switch and actuate the plunger of the syringe only upon a predetermined movement of said pressure plate corresponding timewise to a predetermined optimal positioning at the instant of maximum penetration of said body member by said vaccine applicator needle.

2. Apparatus according to claim 1 wherein said syringe is of needle type.

3. Apparatus according to claim 2 wherein said pressure plate is adjustable relative to said vaccine applicator needle for said optimal positioning as to needle penetration prior to switch actuation and syringe actuation.

* * * * *